United States Patent [19]

Grondahl et al.

[11] 4,244,676

[45] Jan. 13, 1981

[54] COOLING SYSTEM FOR A GAS TURBINE USING A CYLINDRICAL INSERT HAVING V-SHAPED NOTCH WEIRS

[75] Inventors: Clayton M. Grondahl, Clifton Park; Malcolm R. Germain, Ballston Lake, both of N.Y.

[73] Assignee: General Electric Company, Schenectady, N.Y.

[21] Appl. No.: 44,660

[22] Filed: Jun. 1, 1979

[51] Int. Cl.³ .............................................. F01D 5/18
[52] U.S. Cl. .................................. 416/92; 416/96 R
[58] Field of Search ....................... 416/92, 95, 96, 97

[56] References Cited

U.S. PATENT DOCUMENTS

| | | | |
|---|---|---|---|
| 3,066,910 | 12/1962 | Bluck | 416/96 |
| 3,658,439 | 4/1972 | Kydd | 416/97 |
| 3,804,551 | 4/1974 | Moore | 416/97 |
| 4,017,210 | 4/1977 | Darrow | 416/97 |
| 4,184,797 | 1/1980 | Anderson et al. | 416/95 |

FOREIGN PATENT DOCUMENTS

| | | | |
|---|---|---|---|
| 43-1442 | 1/1968 | Japan | 416/96 |
| 506479 | 5/1939 | United Kingdom | 416/96 |
| 913167 | 4/1959 | United Kingdom | 416/95 |
| 935383 | 8/1963 | United Kingdom | 416/95 |

Primary Examiner—Everette A. Powell, Jr.
Assistant Examiner—A. N. Trausch, III
Attorney, Agent, or Firm—J. C. Squillaro

[57] ABSTRACT

An improved cooling system for a gas turbine is disclosed. A plurality of V-shaped notch weirs are utilized to meter a coolant liquid from a pool of coolant into a plurality of platform and airfoil coolant channels formed in the buckets of the turbine. The V-shaped notch weirs are formed in a separately machined cylindrical insert and serve to desensitize the flow of coolant into the individual platform and airfoil coolant channels to design tolerances and non-uniform flow distribution.

14 Claims, 10 Drawing Figures

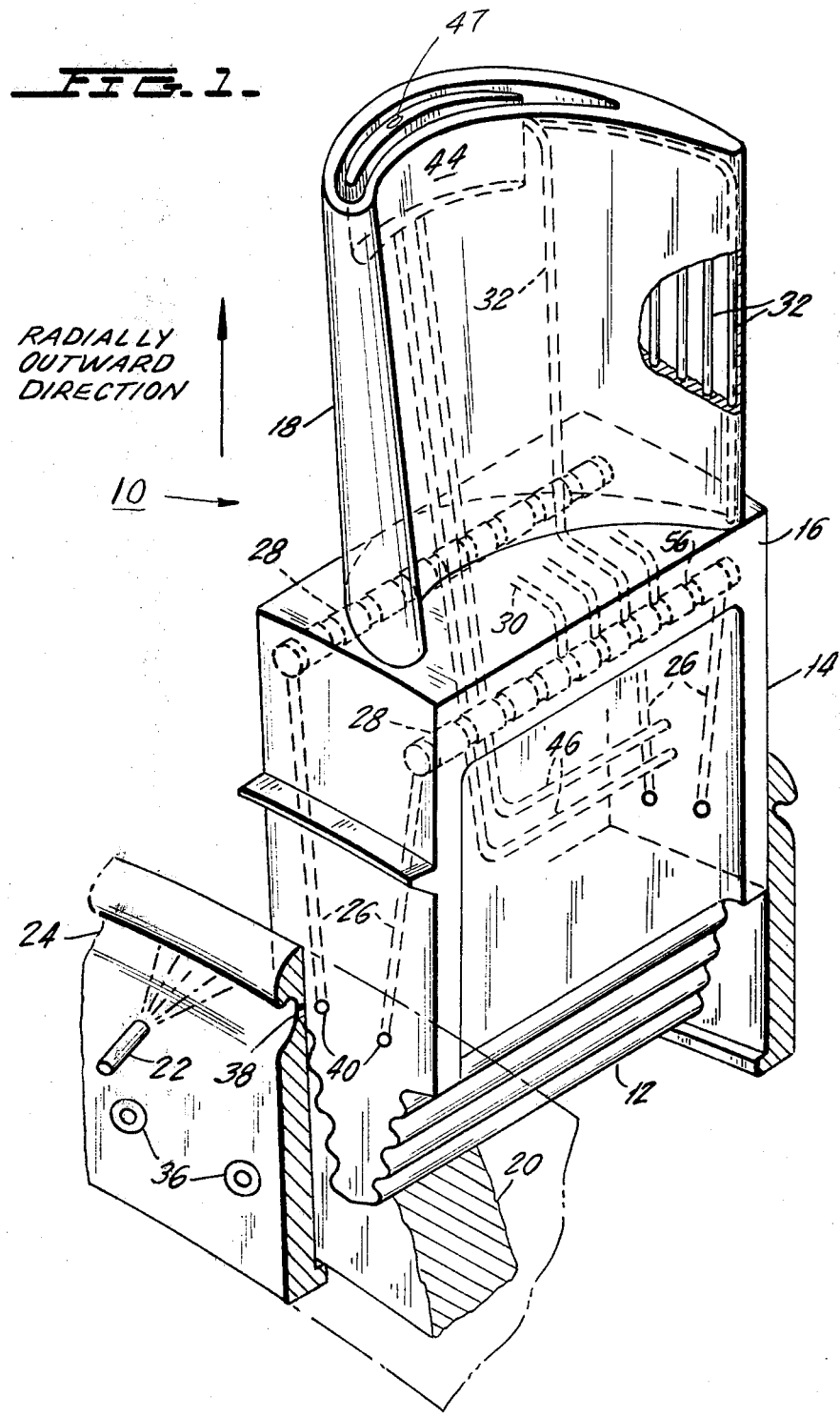

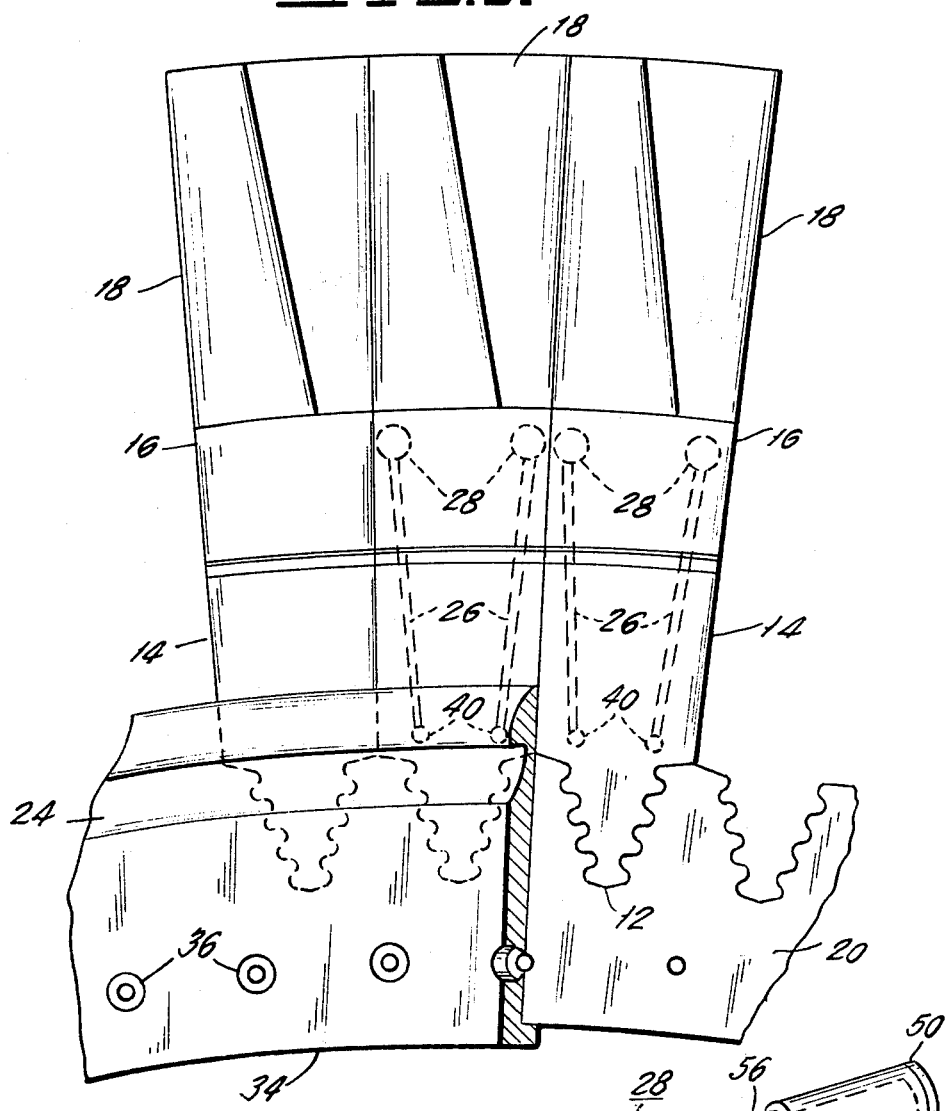
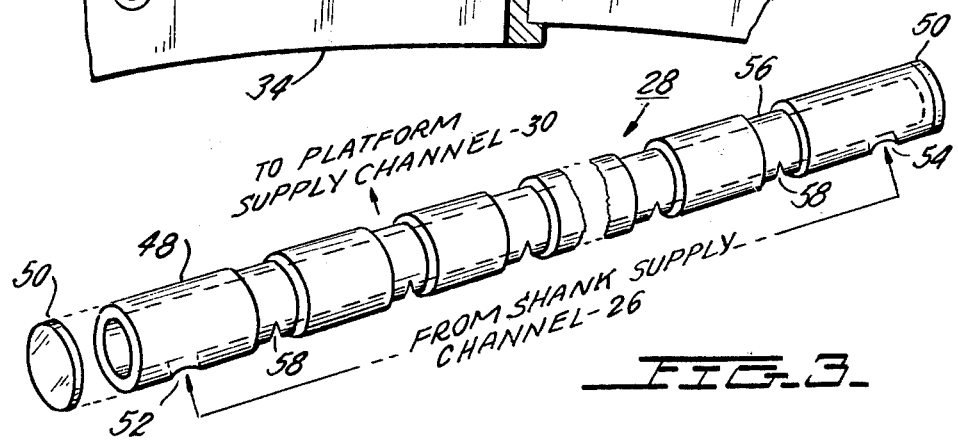

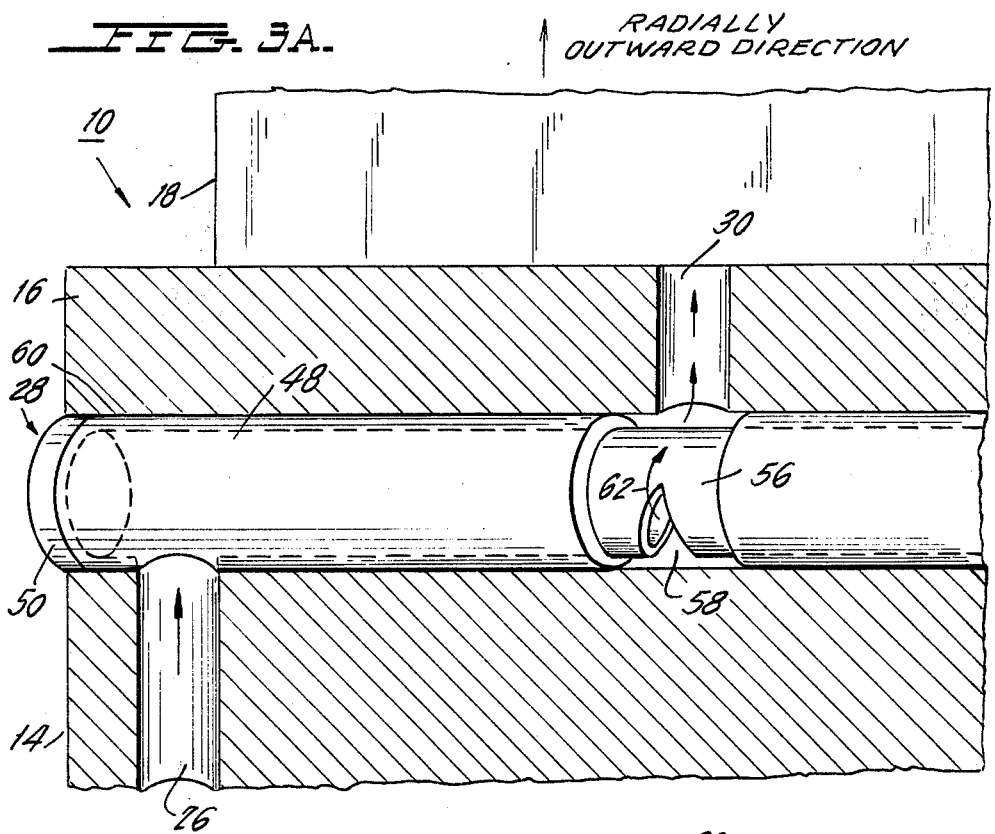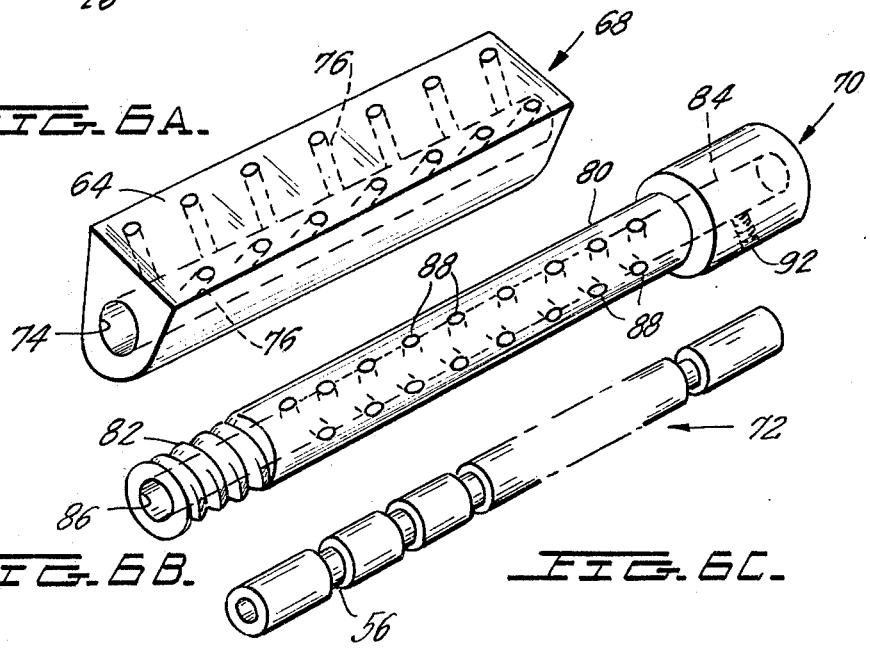

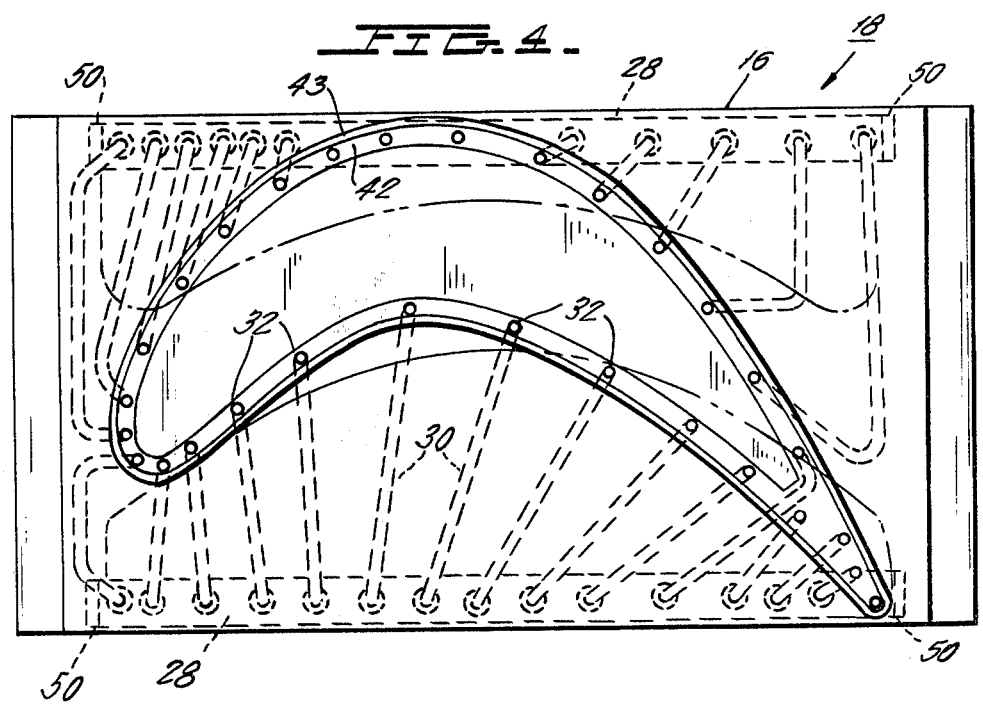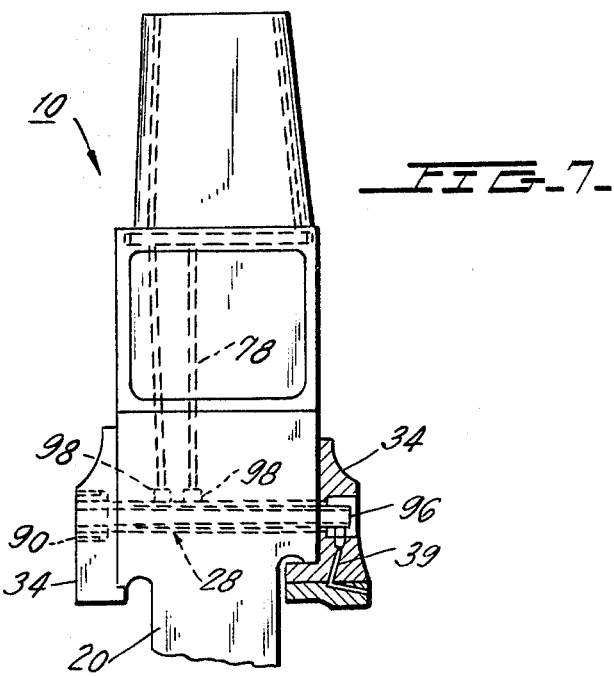

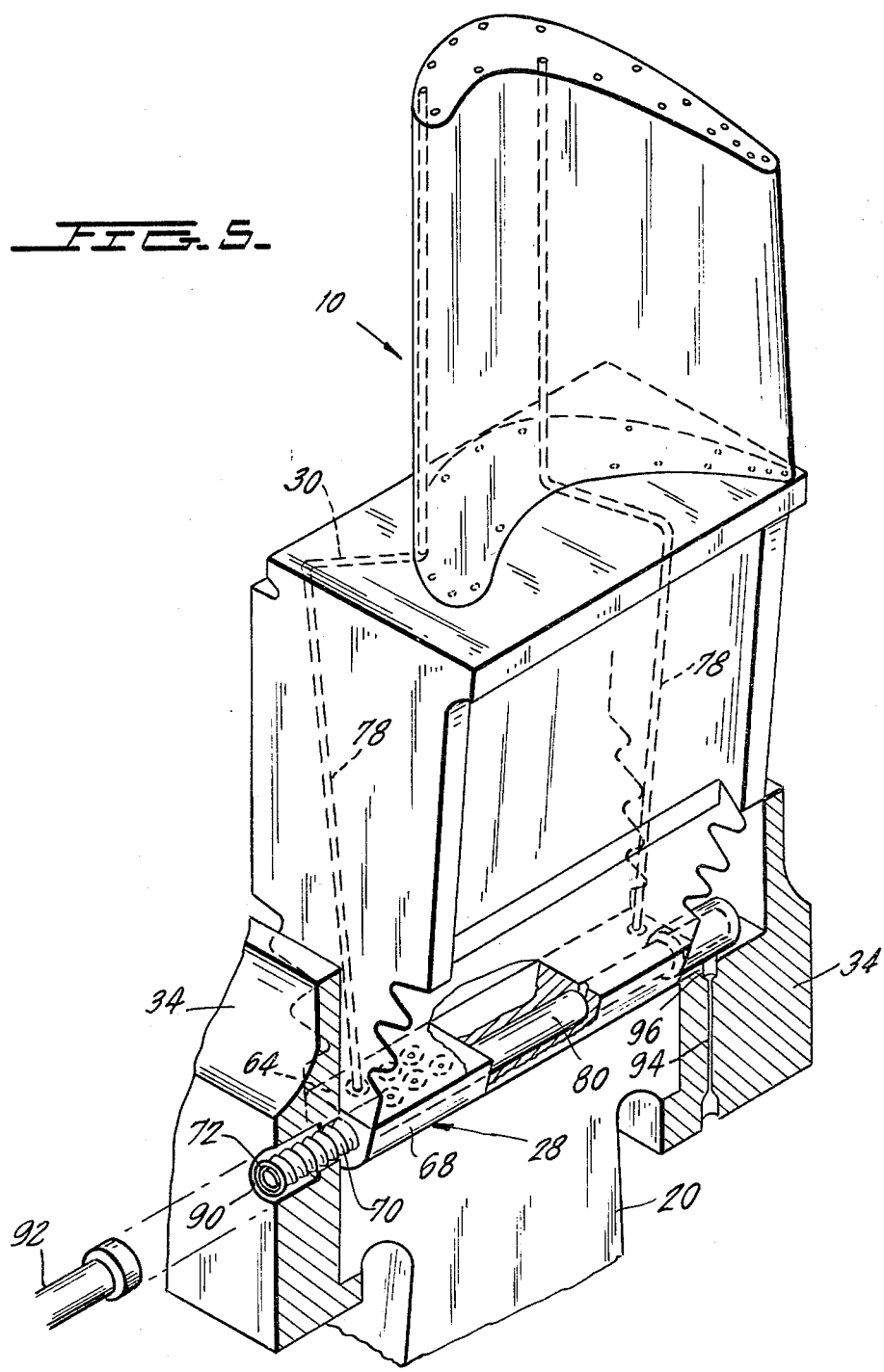

COOLING SYSTEM FOR A GAS TURBINE USING A CYLINDRICAL INSERT HAVING V-SHAPED NOTCH WEIRS

BACKGROUND OF THE INVENTION

The present invention is directed towards an improved cooling system for a gas turbine. More particularly, the present invention is directed towards an improved cooling system which utilizes a cylindrical distribution channel having a plurality of V-shaped notch weirs formed therein for metering coolant into a plurality of platform and airfoil distribution channels located in the buckets of the gas turbine.

The cooling system of the present invention is utilized in connection with a gas turbine of the type including a turbine disk mounted on a shaft rotatably supported in a casing and a plurality of turbine buckets extending radially outward from the disk. Each of the buckets includes a root portion mounted in the disk, a shank portion extending radially outward from the root portion to a platform portion, and an airfoil extending radially outward from the platform portion. During operation, the buckets receive a driving force from hot fluid moving in a direction generally parallel to the axis of the shaft and convert this driving force to rotational motion which is transmitted to the shaft via the turbine disk. As the result of the relatively high temperatures of the hot fluid, a significant amount of heat is transferred to the turbine buckets. In order to remove this heat from the bucket structure, the prior art has developed a large variety of open-liquid cooling systems. Exemplary of such systems are U.S. Pat. No. 3,658,439, issued to Kydd; U.S. Pat. No. 3,804,551, issued to Moore; U.S. Pat. No. 4,017,210, issued to Darrow; and U.S. application Ser. No. 910,500, filed May 30, 1978 now U.S. Pat. No. 4,212,587 in the name of Michael Horner. The disclosures of the foregoing patents are incorporated herein by reference.

Open circuit liquid cooling systems are particularly important because they make it feasible to increase the turbine inlet temperature to an operating range of from 2500° F. to at least 3500° F. thereby obtaining an increase in power output ranging from about 100–200% and an increase in thermal efficiency ranging to as high as 50%. A primary requirement of open circuit liquid cooling systems is that the liquid coolant be evenly distributed to the several platform and airfoil distribution channels formed in the bucket. Such a distribution is difficult to obtain as a result of the extremely high buckets tip speeds employed, resulting in centrifugal fields of the order of 25,000 G. To obtain an even flow of coolant liquid throughout the several coolant channels, the prior art systems, as exemplified by U.S. Pat. Nos. 3,804,551 and 4,017,210, utilize weir structures which meter the amount of coolant liquid supplied to each individual channel from pools of coolant liquid formed in the platform portion of the bucket. Particularly, these systems introduced liquid coolant into each end of a trough formed in the platform portion of the bucket such that liquid coolant flows in a direction parallel to the axis of rotation of the turbine disk from each end of the trough. The liquid coolant flows over the top of an elongated weir which performs the metering for each channel. In order to perform satisfactorily, it is critical that the top of the prior art weir is parallel to the axis of rotation of the turbine within a tolerance of several mils. If this relationship is not maintained, all of the coolant liquid will flow over the low end of the weir and consequently, some of the coolant channels formed in the platform and airfoil of the bucket will be starved for coolant.

BRIEF DESCRIPTION OF THE INVENTION

In order to overcome the foregoing drawbacks of the prior art metering structure, the present invention utilizes a novel coolant distribution channel which may be fabricated separately from the turbine buckets and supplies a metered amount of coolant to each of a plurality of platform and airfoil coolant channels. Since the coolant distribution channel may be independently fabricated and inserted into the bucket structure, it is amenable to precision manufacture and inspection. More particularly, the distribution channel of the present invention comprises:

(1) a cylindrical insert having a plurality of grooves formed at spaced locations around the periphery thereof, each of said grooves aligning with a different platform coolant channel which supplies coolant to airfoil coolant channels formed in the airfoils of the buckets; and (2) a V-shaped notch weir formed in each of said grooves for permitting liquid coolant located in the interior of said insert to flow through said V-shaped notches and into said grooves responsive to a centrifugal force imparted to said liquid coolant by the rotation of the turbine of which the buckets form a part.

BRIEF DESCRIPTION OF THE DRAWINGS

For the purpose of illustrating the invention, there are shown in the drawings several forms which are presently preferred, it being understood, however, that this invention is not limited to the precise arrangements and instrumentalities shown.

FIG. 1 is a perspective view of a first embodiment of the improved cooling system of the present invention.

FIG. 2 is a plan view showing the relative location of a plurality of turbine buckets in a gas turbine of the type which may be cooled by the cooling system of the present invention.

FIG. 3 is a perspective view of the distribution channel forming part of the cooling system of FIG. 1.

FIG. 3A illustrates the interrelationship between the distribution channel of FIG. 3 and certain channels formed in the turbine bucket.

FIG. 4 is a top plan view of the turbine bucket which is illustrated in FIG. 1.

FIG. 5 is a perspective view of a second embodiment of the improved cooling system of the present invention.

FIG. 6A is a perspective view of an outer casing forming part of the distribution channel of the present invention.

FIG. 6B is a perspective view of an inner casing forming part of the distribution channel of the present invention.

FIG. 6C is a perspective view of a cylindrical tube forming part of the distribution channel of the present invention.

FIG. 7 is a side plan view of a single turbine bucket and distribution channel formed in accordance with the present invention.

DETAILED DESCRIPTION OF THE INVENTION

Referring now to the drawings, wherein like numerals indicate like elements, there is shown in FIG. 1 a turbine bucket constructed in accordance with the principles of the present invention and designated generally as 10. Bucket 10 includes a root portion 12, a shank portion 14, a platform portion 16 and an airfoil 18. Root portion 12 is embedded in a turbine rotor disk 20 which is mounted on a shaft (not shown) rotatably supported in a casing (not shown). As will be recognized by those skilled in the art, an actual turbine will include a plurality of buckets 10 located about the entire periphery of the rotor disk 20. The relative placement of several buckets 10 is illustrated in FIG. 2.

As noted above, the present invention is directed towards an improved cooling system for use with gas turbines of the general type illustrated in FIG. 1. The cooling system of the present invention includes a coolant jet 22, which supplies coolant liquid to the turbine system, a coolant collecting channel 24, which distributes the coolant to the individual buckets 10, and a system of coolant channels 26–32 which are formed in the bucket 10 and distribute the coolant throughout the surface area of platform 16 and airfoil 18. The system of coolant channels 26–32 will be described in greater detail below.

Coolant collecting channel 24 is formed in a 360° ring 34 which is preferably coupled to rotor disk 20 by a plurality of fasteners 36. The position of the ring 34 is carefully chosen to ensure that passages 38 formed in coolant collecting channel 24 are precisely aligned with matching passages 40 formed in the side wall of the shank portion of bucket 10. Passages 38 are preferably evenly distributed throughout the channel 24 to ensure equal coolant flow into each passage 38. By this means, an equal amount of coolant will be supplied to each pair of shank supply channels 26 (formed in shank portion 14) and thereby to each bucket 10. As clearly shown in FIG. 1, a separate ring 34 is located on either side of bucket 10 and supplies an identical pair of shank supply channels 26 on either side of shank portion 14. Alternately, a bore feed water delivery system, such as described in copending patent application Ser. No. 842,407, filed Oct. 17, 1977 by Anderson et al, now U.S. Pat. No. 4,184,797 could be employed if desired.

Shank supply channels 26 direct the coolant liquid to a pair of distribution channels 28 located on either side of platform 16. The structure of distribution channels 28 is illustrated in FIG. 3 and is described in detail below. The coolant liquid supplied by shank supply channel 26 collects in distribution channel 28 and is thereafter metered into a plurality of platform coolant channels 30 formed in the platform 16. As best seen in FIG. 4, platform coolant channels 30 extend from distribution channels 28 to a plurality of foil coolant channels 32 formed in the copper matrix core 42 of foil 18. The foil coolant channels 32 extend in a generally radial direction throughout the outer perimeter of airfoil 18 and serve to cool the outer skin 43 of the foil.

As shown in FIG. 1, foil coolant channels 32 terminate in a manifold 44 which centrifically separates steam and water, with the water being expelled from the bucket through a tip shroud jet 47, the steam is recirculated to the shank portion of the bucket through passages 46, as shown.

The detailed structure of distribution channels 28 will now be described with reference to FIGS. 3 and 3A. As shown in FIG. 3, distribution channel 28 includes a hollow cylindrical tube 48 and a pair of side covers 50 which may, if desired, be formed integrally with the tube 48. A pair of supply openings 52, 54 are formed on either side of tube 48 and permit the passage of coolant liquid from shank supply channels 26 into the interior of tube 48. A plurality of grooves 56 are formed around the outer perimeter of tube 48 at spaced intervals corresponding to the spacing of platform coolant supply channels 30 formed in platform portion 16 (see FIG. 4) such that each groove 56 cooperates with a different cooling channel 30. Liquid coolant supplied to distribution channel 28 via openings 52, 54 exits distribution channel 28 via individual V-shaped notch weirs 58 formed in each of the grooves 56. V-shaped notches 58 are inclined with respect to the local horizontal to ensure that flow will not be divided between intersections of the V-shaped notch 58 and groove 56.

The manner in which liquid coolant is supplied to coolant channels 30 by distribution channel 28 can best be understood with reference to FIG. 3A. FIG. 3A depicts the left-hand portion of distribution channel 28 after it has been inserted into a corresponding cylindrical opening 60 formed in the platform portion 16 of bucket 10. As the bucket rotates about the central axis of the turbine, the coolant fluid is forced in a radial outward direction by centrifugal force as such, the coolant flows through channel 26 into the interior of tube 48 where it collects on the radially outward inner wall of tube 48. The coolant distributes throughout the distribution channel 28 and builds up in height until it reaches the apex of the V-shaped notch 58 at which time it flows through the notch 58 and into the groove 56 (see arrow 62). The so metered coolant flows into its associated platform distribution channel 30 and thereafter to a corresponding foil coolant channel 32.

The cylindrical opening 60 formed in bucket 10 has a diameter which will ensure an interference fit with distribution channel 28. When distribution channel 28 is properly oriented in the opening 60, possibly by the use of witness marks located on the outside of side cover 50, the distribution channel 28 is secured, such as by welding or brazing to bucket 10.

As a result of the foregoing structure, the distribution channel 28 of the present invention provides a highly uniform metering system for supplying coolant to each of the individual coolant channels 30, 32. Additionally, as a result of the use of V-shaped notch weirs, the distribution channel of the present invention is highly insensitive to design tolerances and non-uniform flow distributions.

The manner in which coolant flows through bucket 10 during a typical operation of the gas turbine will now be reviewed. The buckets 10 receive a driving force from a hot fluid moving in a direction generally parallel to the axis of rotation of rotor disk 20. The driving force of the hot fluid is transmitted to the shaft about which the rotor disk 20 is mounted via the buckets 10 and turbine disk 20 causing the turbine to rotate about the axis of the shaft. The high rotational velocity of the rotor creates a substantial centrifugal force which urges the liquid coolant through the bucket in a radially outward direction. As the liquid coolant enters coolant collecting channel 24, it is forced in a radially outward direction along the radially outermost periphery of channel 24 and into the plurality of passages 38. Due to the even spacing of passages 38, an equal amount of coolant will be supplied to each shank supply channel 26 on either side of bucket 10. The centrifugal force created by the rotation of the turbine forces the liquid coolant to move through channels 26 in a radially outward direction into distribution channels 28 where it is collected in the tube 48. When the level of coolant in the tube 48 reaches the V-shaped notch weirs 58, the coolant is metered by the weirs 58 and supplied to a respective platform channel 30 and thereafter to respective foil coolant channel 32. The coolant continues to advance in a generally radial direction to the tip of foil 18 and is collected in manifold 44. The coolant is normally in a vaporized state at this time and is permitted to consolidate in manifold 44. After consolidation, the coolant is removed from the manifold chamber either via a tip shroud jet or through a pair of steam return channels 46.

A second embodiment of the present invention is illustrated in FIGS. 5-7. The primary difference between this embodiment and the above-described embodiment is that the distribution channel 28 fits into a recess provided in the wheel rim 20 and is located below the bucket 10. As shown in FIG. 5, the distribution channel 28 has a flattened top 64 which mates with a flattened bottom 66 of the turbine bucket 10 when the bucket and distribution channel are placed in the dovetail opening formed in rotor disk 20. Both surfaces 64, 66 are machined flat and parallel with the convolutions of the dovetail slot so that the centrifugal force applied to distribution channel 28 when the turbine is rotating ensures parallelism between these surfaces and the dovetail slots.

As shown in FIGS. 6A-6C, distribution channel 28 comprises three parts: an outer casing 68, an inner casing 70, and a hollow cylindrical tube 72. Outer casing 68 fits on the bottommost convolution of the dovetail slot in rotor disk 20. A cylindrical bore 74 is formed in outer casing 68 and receives inner casing 70 in interference fit therewith. A plurality of coolant channels 76 are formed in the top of casing 68 and each extend from bore 74 to flat upper surface 64. Coolant channels 76 are equal in number to the number of platform cooling channels 30 and are each connected to a respective platform coolant channel 30 by one of the shank coolant channels 78. Alternately, distribution channel 28 may comprise two concentric parts including cylindrical tube 72 and a casing incorporating the functions of the outer and inner casing 68 and 70 respectively.

Inner casing 70 has a hollow cylindrical central section 80, a threaded extension section 82 and a coolant supply receiving section 84. The outer diameter of central section 80 is substantially identical to the inner diameter of bore 74 to ensure an interference fit when central section 80 is placed in bore 74. The length of central section 80 is equal to the length of bore 74 such that sections 82 and 84 extend beyond opposite ends of outer casing 68. A central bore 86 extends throughout the length of casing 70 and receives the hollow cylindrical tube 72 illustrated in FIG. 6C. A plurality of coolant channels 88 are formed in inner casing 70 and each extend from central bore 86 to the outer surface of casing 70. Coolant channels 88 are equal in number to the number of coolant channels 76 and are so located that they will interface with coolant channels 76 after central casing 70 has been placed in cylindrical bore 74 and properly aligned.

After inner casing 70 has been inserted in outer casing 68, tube 72 is inserted into the opening 86 in casing 70. Tube 72 is identical in construction to tube 48 and includes a plurality of grooves 56, each of which cooperates with a different coolant channel 88 in the manner described above with reference to FIG. 3A.

When distribution channel 28 has been placed in its position within the dovetail slot formed in rotor disk 20 (see FIG. 5), threaded extension section 82 extends through an opening 90 in ring 34. In the preferred embodiment, the external threads on extension section 80 engage a retaining nut 92 which serves to lock ring 34 to rotor disk 20.

Coolant supply receiving section 84 of inner casing 70 extends out the opposite side of casing 68 and, if desired, may be adapted to receive a similar retaining nut. In any case, both ends of casing 70 must be closed off to permit the retention of coolant fluid in bore 86. Coolant fluid enters bore 86 through sleeve 96 which communicates with a channel 94 formed in section 84. Coolant is supplied to channel 94 by a supply source (not shown) which supplies coolant to coolant supply channel 94 (FIG. 5) formed in ring 34.

As best shown in FIG. 7, a plurality of trap seals 98 are interposed in shank channels 78 (preferably at the bottom thereof) to permit the passage of liquid coolant from distribution channel 28 to coolant channels 78 but prevent the passage of coolant vapor from coolant channel 78 to distribution channel 28. The structure of these cooling channels is described in detail in U.S. patent application Ser. No. 044,539, filed June 1, 1979 in the name of C. M. Grondahl and M. R. Germain and assigned to the assignee of the present invention. The disclosure of the foregoing patent is incorporated herein by reference. Such trap seals may also be used in the first embodiment of the present invention (see FIG. 1) in which case they would be located in platform section 16 directly above distribution channel 28.

The present invention may be embodied in other specific forms without departing from the spirit or essential attributes thereof and, accordingly, reference should be made to the appended claims, rather than to the foregoing specification, as indicating the scope of the invention.

What is claimed is:

1. An improved liquid coolant distribution system for a gas turbine of the type including a turbine disk mounted on a shaft rotatably supported in a casing, at least one turbine bucket extending radially outward from said disk, said bucket including a root portion mounted in said disk, a shank portion extending radially outward from said root portion to a platform portion, and an airfoil extending radially outward from said platform portion, said distribution system comprising:
  (a) platform coolant channels located in said platform portion and extending into foil coolant channels located in said airfoil portion; and
  (b) metering means for receiving coolant from a source of liquid coolant and for distributing said coolant evenly into each of said platform coolant supply channels, said metering means comprising:
    (1) a hollow cylindrical tube having a plurality of grooves formed at spaced intervals about the outer periphery thereof;
    (2) a V-shaped notch weir formed in each of said grooves, each said V-shaped notch weir extending through the wall of said hollow cylindrical tube so as to permit coolant contained in said tube to flow through said notch weir and into said grooves;

(3) cylindrical housing means receiving said cylindrical tube, said housing means cooperating with said grooves to form fluid conducting channels for said coolant; and (4) a plurality of coolant transporting channels equal in number to the number of said grooves, each of said coolant transporting channels extending from its associated groove to a different one of said platform coolant channels.

2. The improved liquid coolant distribution system of claim 1, wherein said cylindrical housing means is formed in said platform portion of said bucket.

3. The improved liquid coolant distribution system of claim 2, further including shank coolant supply channels formed in said shank portion of said bucket for supplying liquid coolant to said metering means.

4. The improved coolant distribution system of claim 3, wherein said cylindrical tube has first and second openings formed at either end thereof, each of said openings communicating with a different one of said shank coolant supply channels.

5. The improved cooling system of claim 4, wherein said source of coolant liquid includes:

(a) first and second 360° rings coupled to said rotor disk on opposite sides of said buckets, each of said rings having a 360° coolant collecting channel formed therein;

(b) means for supplying liquid coolant to said coolant collecting channels; and (c) a passage formed in each of said coolant collecting channels in an area adjacent said shank portion of said bucket, each of said passages being aligned with a different one of said shank coolant supply channels and permitting coolant to pass through said passages to said shank coolant supply channels.

6. The improved liquid coolant distribution system of claim 1 or 5, wherein said V-shaped notch weirs are formed in the radially innermost portion of said hollow cylindrical tube.

7. The improved liquid coolant distribution system of claim 1, wherein said cylindrical housing means is located in a recess formed in said disc below said bucket.

8. The improved liquid coolant distribution system of claim 7, wherein said metering means further includes an outer housing adapted to be received within said recess formed in said turbine disk below said bucket, the radially outermost portion of said outer housing being formed with a planar surface and being adapted to mate with a corresponding planar surface of said bucket.

9. The improved liquid coolant distribution system of claim 8, wherein said cylindrical housing means is located in said outer housing.

10. The improved liquid coolant distribution system of claim 9, wherein each of said coolant transporting channels extends from its associated groove through both said outer housing and said shank portion to a different one of said platform cooling channels.

11. The improved liquid coolant distribution system of claim 10, wherein said source of liquid coolant comprises:

(a) first and second 360° rings coupled to opposite sides of said rotor disk and each having a 360° coolant collecting channel formed therein;

(b) means for supplying liquid coolant to each of said coolant collecting channels; and (c) a passage formed in each of said coolant collecting channels in an area adjacent said shank portion of said bucket and guiding coolant applied to said coolant collecting channel into said shank coolant passage.

12. The improved liquid coolant distribution system of claim 11, wherein said cylindrical housing means includes threaded extension sections projecting from opposite sides of said outer housing, each of said threaded sections extending through an associated opening in a different one of said rings, and further including a pair of retaining nuts, each of said nuts threadedly engaging a different one of said threaded portions of said cylindrical housing means so as to retain said 360° rings on said disk.

13. The improved liquid distribution system of claims 7 or 12, wherein said V-shaped notch weirs are formed in the radially innermost portion of said hollow cylindrical tube.

14. The improved liquid distribution system of claims 1 or 5 wherein said V-shaped notch weirs are inclined with respect to the local horizontal.

* * * * *